United States Patent
Thomas (10) Patent No.: US 8,661,956 B2
(45) Date of Patent: Mar. 4, 2014

(54) REAR MOUNTED MITER SAW FENCE

(75) Inventor: Adam S. Thomas, Aurora, IL (US)

(73) Assignee: Robert Bosch GmbH, Stuttgart, DE (US)

( * ) Notice: Subject to any disclaimer, the term of this patent is extended or adjusted under 35 U.S.C. 154(b) by 831 days.

(21) Appl. No.: 12/540,712

(22) Filed: Aug. 13, 2009

(65) Prior Publication Data

US 2011/0036223 A1    Feb. 17, 2011

(51) Int. Cl.
*B26D 7/02* (2006.01)
*B26D 1/14* (2006.01)

(52) U.S. Cl.
USPC .......................................... 83/471.3; 83/468.1

(58) Field of Classification Search
USPC ............... 83/468.7, 471.3, 468.1–468.4, 490
See application file for complete search history.

(56) References Cited

U.S. PATENT DOCUMENTS

| | | | | |
|---|---|---|---|---|
| 2,242,336 A * | 5/1941 | Atwood | ........................... | 83/488 |
| 2,627,880 A * | 2/1953 | Johnson | ........................... | 83/574 |
| 4,355,557 A * | 10/1982 | Mecsey | ........................... | 83/565 |
| 4,452,117 A * | 6/1984 | Brickner et al. | ................ | 83/468 |
| 4,709,607 A * | 12/1987 | Buhayar | ......................... | 83/342 |
| 4,745,834 A * | 5/1988 | Neumann | ........................ | 83/468 |
| 5,042,348 A * | 8/1991 | Brundage et al. | ............ | 83/471.3 |
| 5,297,463 A * | 3/1994 | O'Banion et al. | ........... | 83/468.3 |
| 5,755,148 A | 5/1998 | Stumpf et al. | | |
| 5,771,767 A * | 6/1998 | Itami | .......................... | 83/435.13 |
| 5,799,367 A * | 9/1998 | Simon et al. | .................. | 16/86 A |
| 5,855,366 A * | 1/1999 | Chang | ........................... | 269/315 |
| 5,943,931 A * | 8/1999 | Stumpf et al. | ............... | 83/468.2 |
| 6,418,830 B1 * | 7/2002 | Stumpf et al. | ............... | 83/468.2 |
| 7,140,286 B2 * | 11/2006 | Schwartz | ........................ | 83/446 |
| 2006/0266182 A1 * | 11/2006 | Balolia | ......................... | 83/471.3 |
| 2008/0022824 A1 | 1/2008 | Chang | | |
| 2009/0095141 A1 * | 4/2009 | Billings et al. | ............... | 83/468.3 |

\* cited by examiner

*Primary Examiner* — Ghassem Alie
*Assistant Examiner* — Bharat C Patel
(74) *Attorney, Agent, or Firm* — Maginot, Moore & Beck (57) ABSTRACT

A power miter saw includes a base having a rotatable table and side. The side portions have a flat working surface for supporting a work piece. A fence assembly extends between the base side portions and has a front vertical contacting surface and an opposite rear surface, each of the base side portions having a generally vertical fence positioning surface extending downwardly substantially perpendicularly from the flat working surfaces. A securing mechanism holds the fence assembly securely to the vertical fence positioning surfaces.

12 Claims, 7 Drawing Sheets

REAR MOUNTED MITER SAW FENCE

BACKGROUND OF THE INVENTION

The present invention is generally related to power miter saws.

The attachment method for a fence on all known miter saws is generally the same. Such known fence systems are attached to the saw from the top. The fence bolts drop through holes on the fence and thread into holes in the base. With few known exceptions, the fence sits on the same surface that holds the work piece during cutting.

The majority of miter saws rely on limited movement of the fence to make it square to the blade. While this system is simple, it poses several problems. First, the fence is allowed to move left to right, front to back, and rotate about a vertical axis. All that is truly needed to bring the fence square to the blade is the rotation about a vertical axis. The extra movement makes adjustment difficult. To square the saw, the user is required to hold a square against the moving fence while positioning it in three directions, making a simple task very difficult. Second, the fence can easily go out of square when the bolts are tightened. As the bolt begins to grab the fence, the fence will begin to rotate with the bolt. The user must prevent the fence from moving while tightening the bolts. A third problem relates to the addition of a sacrificial fence. Many users will add a sacrificial fence to the front of the fence provided with the miter saw. A sacrificial fence usually consists of a custom cut piece of wood about ¾" thick. Because this piece bolts on to the front of the fence provided with the tool, the capacity of the tool is reduced.

SUMMARY OF THE INVENTION

A power miter saw comprising a base having a center portion configured to support a rotatable table and side portions on opposite sides of the center portion, the side portions having a flat working surface for supporting a work piece, a table rotatably connected to the saw base and having a zero miter angle position, a saw blade and motor assembly operatively connected to the table, the fence positioning surfaces being configured to accurately position a fence assembly relative to the table, a fence assembly extending between the base side portions having a front vertical contacting surface and an opposite rear surface, each of the base side portions having a generally vertical fence positioning surface extending downwardly substantially perpendicularly from the flat working surfaces and being coplanar with one another and perpendicular to the plane of the blade when the table is in the zero miter position, and a securing mechanism for applying a substantially horizontal holding force for holding the fence assembly securely to the vertical fence positioning surfaces.

DETAILED DESCRIPTION

Embodiments of the rear mounted miter saw fence of the present invention attach to the rear of the miter saw base instead of the top surface. There are several advantages to this configuration including easier installation, better clamping to the base, and the ability to add a sacrificial fence without reducing the capacity of the saw.

Various embodiments of the rear mounted miter saw fence address all of these issues. The new fence embodiments do not attach to the base of the miter saw with vertically oriented bolts. Instead, the bolts are oriented in a horizontal direction. The bolts are inserted through horizontal holes in the back of the fence and thread into holes in the rear of the base. When the bolts are tightened, the face of the fence is tightened against the rear of the base.

With the rear mounted fence, squaring the blade to the fence is an easy task, because the fence is not moved during adjustment. The rear mounted fence necessitates a system where the miter detents move. This type of system only allows rotation of the detents about a vertical axis.

When the bolts are tightened on the rear mounted fence, the face of the fence is pressed against the rear of the base. Two critical alignment surfaces are perpendicular to the axis of the bolts as opposed to parallel as in all known fence designs. A small horizontal surface on the base helps to align the fence horizontally. Directly behind the horizontal surface is an inclined surface which significantly reduces the amount of required machining. This arrangement eliminates alignment issues caused by tightening the bolts. As long as the bolts are tight, the critical alignment surfaces will be in contact.

The rear mounted fence eliminates the capacity reduction caused by the addition of a sacrificial fence. Embodiments of the present invention allow for a sacrificial fence to be attached using the same method as current miter saw fence designs. However, an improved embodiment is available to the user. Instead of attaching the sacrificial fence to the front of the fence provided with the tool, a sacrificial fence can be installed in place of the provided fence. To do this, a piece of preferably ¾" thick wood (preferably plywood) is cut to a shape similar to the provided fence. The provided fences are removed from the saw. The sacrificial fence is then bolted onto the base in the same manner as the provided fence. Because the fence is not adjusted to square the blade and it will always install in the same position and therefore the removal of the provided fence causes no hardship for the user.

Figure 1:
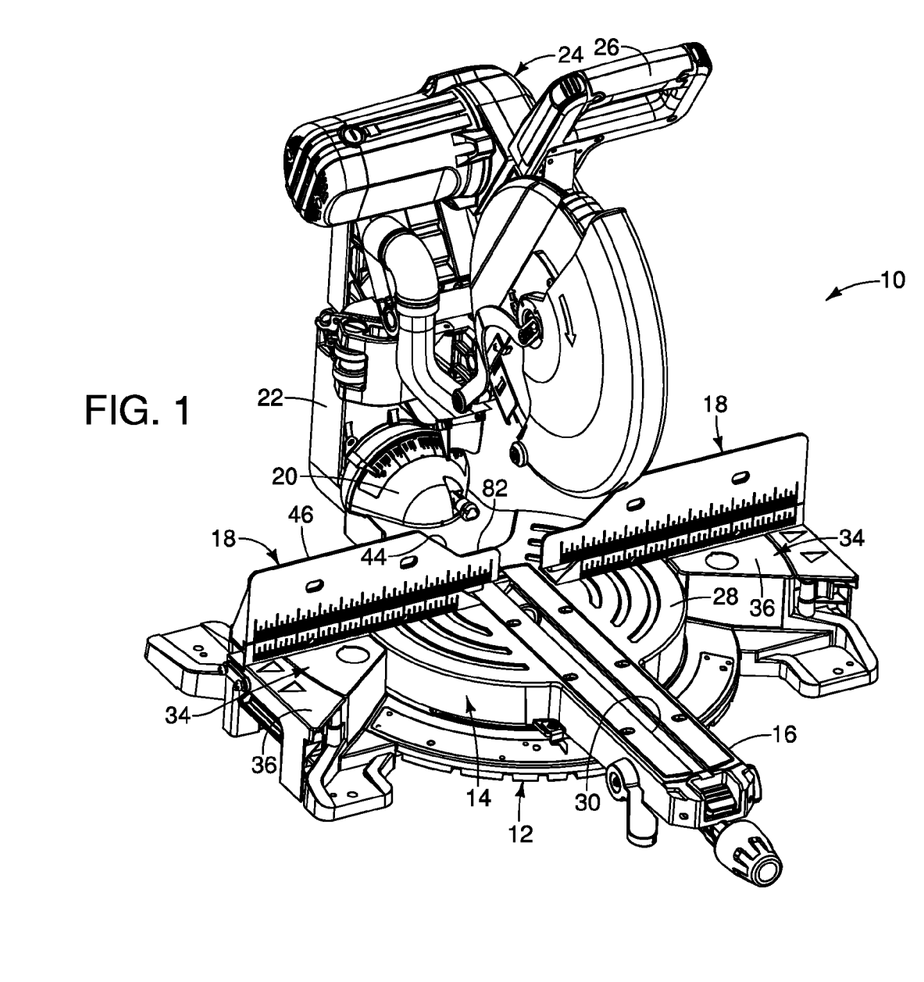
FIG. 1 is a left front perspective view of a power miter saw embodying the present invention.

Turning now to the drawings and particularly FIG. 1, a miter saw, indicated generally at 10, is shown and comprises a base, indicated generally at 12, on which a table indicated generally at 14 is rotatably connected and which has a front miter control arm 16 which is used by an operator to adjust the horizontal miter angle and to lock the angle in the desired position. The saw 10 includes a fence assembly, indicated generally at 18, as well as a rear hub 20 which includes a horizontal pivot shaft (not shown) on which a vertical stand 22 is attached. The saw includes a motor and blade assembly, indicated generally at 24, is pivotable around a horizontal pivot shaft so that the operator can grasp a handle 26 and lower the blade into cutting relationship with a work piece (not shown) that is positioned on the table and portions of the base for cutting. The horizontal shaft enables bevel angles to be cut in the work piece.

The rotatable table 14 has a top surface 28 which has a slot 30 coextensive with the plane of the blade and is provided so that the blade can have a downward reach below the top surface 28 to be able to cut completely through a work piece that is being cut. The base 12 has side portions indicated generally at 34, each of which has a top surface 36. It is preferred that the plane of the top surfaces 36 of the side portions 34 be coextensive with the plane of the top surface 28 of the table so that a flat work piece will be supported by all three components when positioned for cutting.

Figure 2:
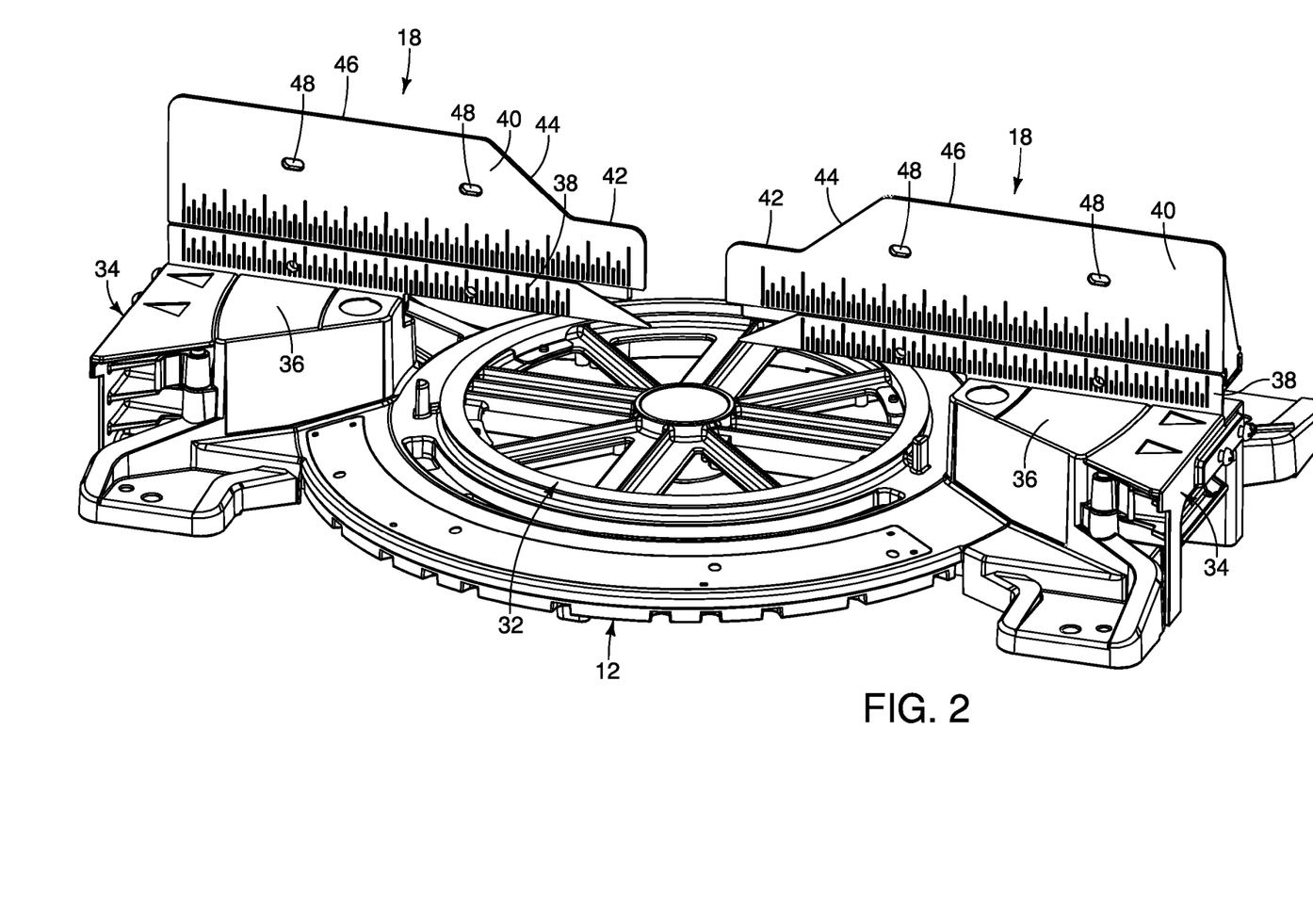
FIG. 2 is a right front perspective of the base and fence assembly of a power miter saw embodying the present invention.

As best shown in FIG. 2, the fence assemblies 18 are connected to the side portions 34 and include a stationary fence portion 38 as well as a removable fence portion 40 that can be slideably positioned relative to the stationary portion 38 to accommodate various types of miter and bevel cuts. In this regard, each of the slideable portions has a reduced height portion 42 that transitions along an incline 44 to a maximum height portion 46. This configuration is provided to enable the saw to be usable at maximum miter and bevel angles without the plate and motor assembly interfering with the fence assemblies 18 during operation.

The removable fences 40 can be slidably adjusted to accommodate the particular angle that a work piece is being cut while providing the necessary support for positioning the work piece during cutting. It is a common practice to have sacrificial fences for providing support generally continuously between the two fence assembles, the only gap being that which is cut by the blade during operation. Such sacrificial fences are typically used by cutting an appropriate board or piece of plywood and attaching it to a fence assembly, such as fence assemblies 18 shown in FIG. 2, with apertures 48 being provided for such purpose. However, as previously indicated, when a sacrificial fence is placed in front of the fence portions 38 and 40, the thickness of the fence reduces the effective area for supporting the work piece on the top surface 28 of the table and top surface 36 on the side portions 34. This also reduces the effective length of cuts that can be accomplished by the blade and motor assembly 24.

The adjustment of the removable fence 40 on the stationary fence 38 is shown and described in copending application Ser. No. 12/220,347 entitled AN ADJUSTABLE FENCE ASSEMBLY FOR A MITER SAW, filed Jul. 24, 2008 which is incorporated by reference herein.

Figure 3:
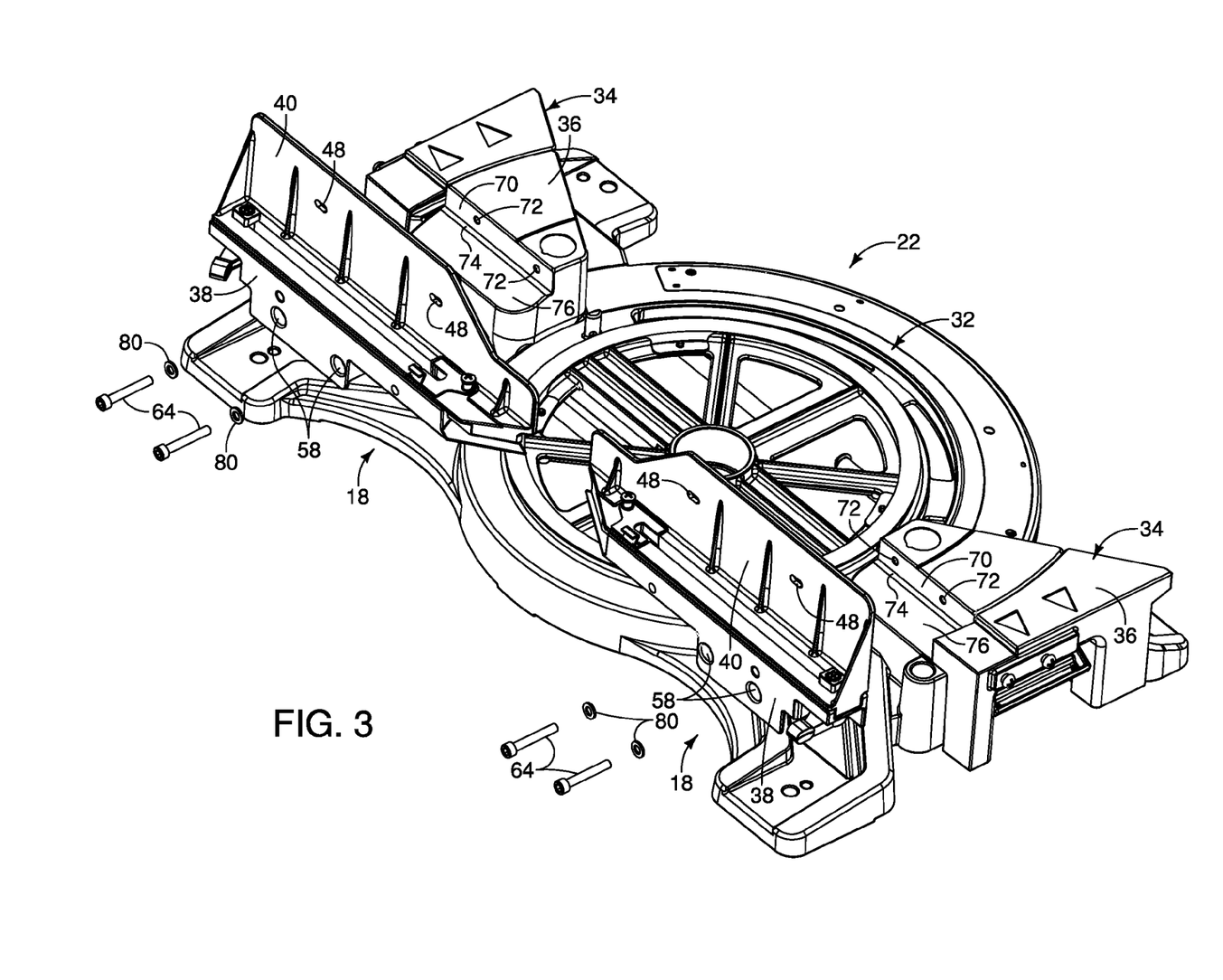
FIG. 3 is left rear exploded perspective of the base and fence assembly of the power miter saw shown in FIG. 2.
Figure 5:
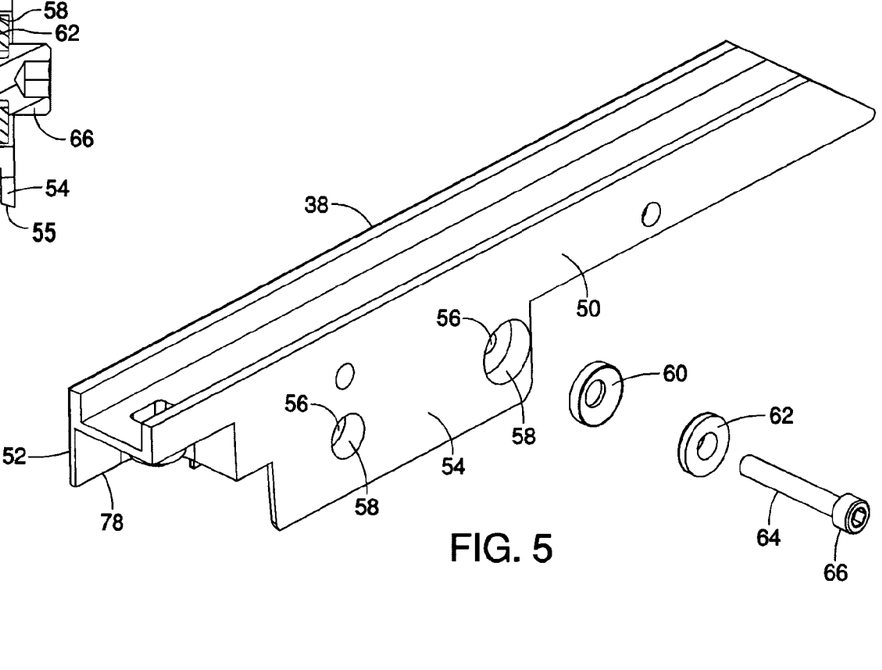
FIG. 5 is a rear perspective of an embodiment of a portion of a fence assembly shown in FIGS. 2, 3 and 4.
Figure 6:
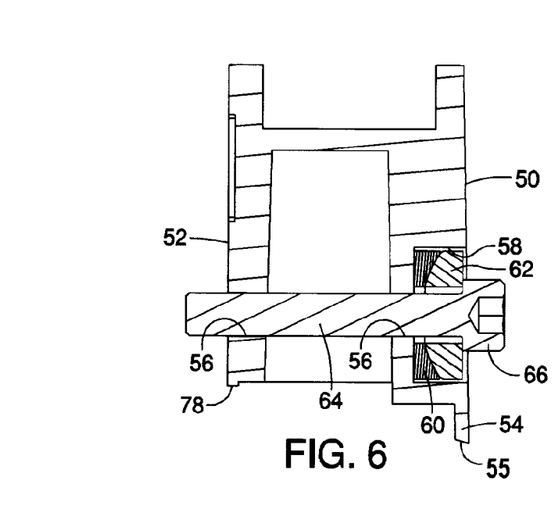
FIG. 6 is cross section of the portion shown in FIG. 5, with a bolt and spherical washer set attached thereto.

As is apparent from the exploded respective view of the base 12 and fence assemblies 18 shown in FIG. 3, the fence assemblies are symmetrical in their construction and therefore identical numbers are used for each of the two fence assemblies, it being understood that they are generally mirror images of one another. The leftward stationary fence portion 38 is shown in FIGS. 5 and 6 and has a rear surface 50 as well as a front surface 52. The rear surface 50 has a rectangular lower extension 54 that is relatively thin as shown in FIG. 6 and has a bottom surface 55 that is slightly angled to correspond to a mating surface on the base 12. The stationary fence portion 38 has a pair of apertures 56 which extend through the entire width of the stationary fence portion as shown in FIG. 6. The preferred embodiment also includes an enlarged cylindrical recess 58 that is sized to receive a spherical washer set which comprises a concave washer 60 and a convex washer 62 which fit together as shown in FIG. 6. A bolt 64 has a head 66 with an internal hex configuration is also shown in FIGS. 5 and 6. When installed as shown in FIG. 6, the head 66 bears against the washer 62.

Figure 4:
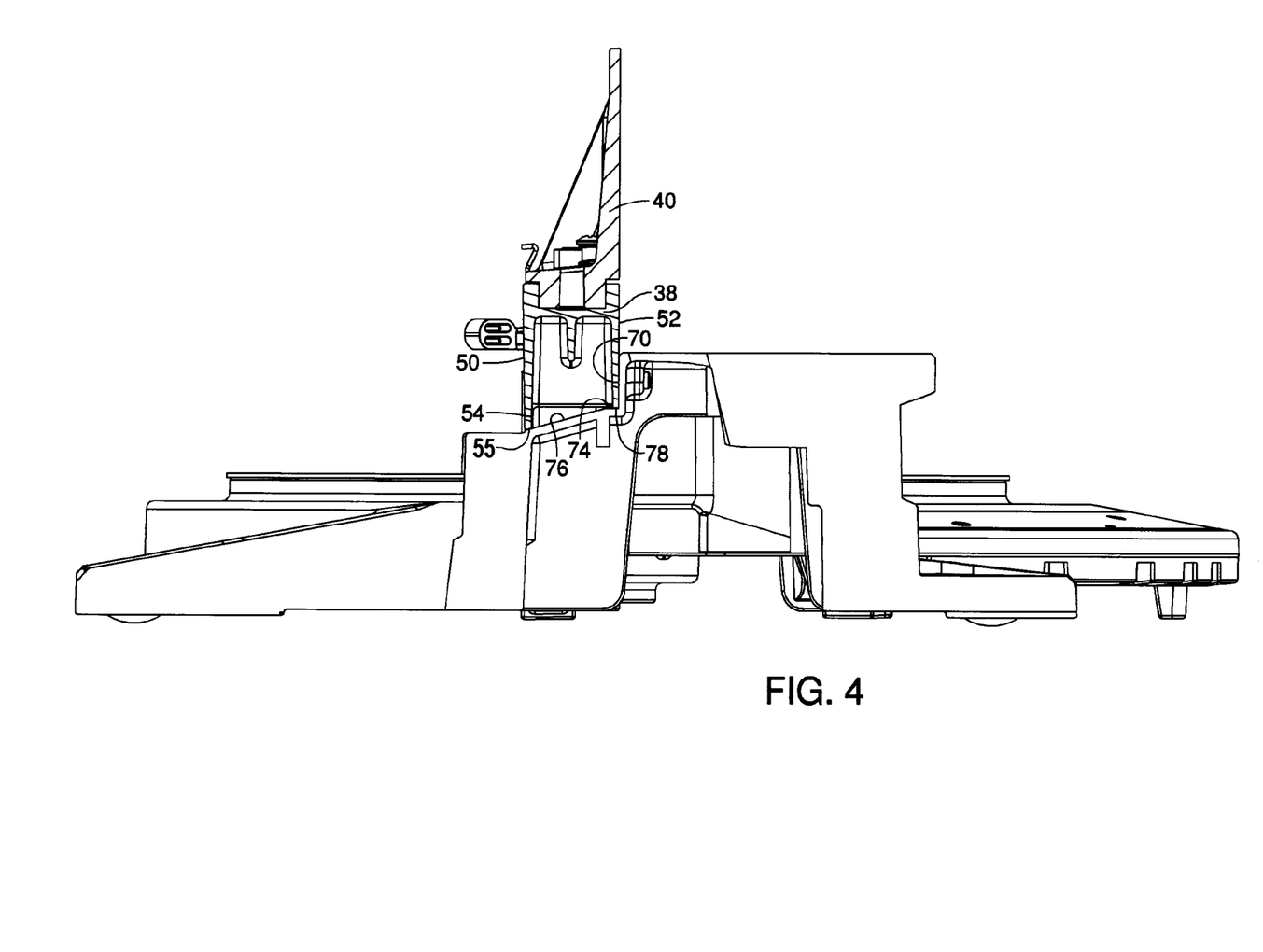
FIG. 4 is a left plan view, partially in section, of the base and fence assembly shown in FIGS. 2 and 3.

As shown in perspective in FIG. 3, the side portions 34 have a vertical fence locating surface 70 that includes a pair of apertures 72 that are threaded and sized to receive bolts 64 for mounting the fence assemblies 18 and particularly the stationary fence portion 38 to the side portions 34 of the base 12. The side portions also have a horizontal narrow surface 74 which then merges with a downwardly inclined surface 76. The narrow horizontal surface 74 is provided to engage a bottom surface 78 of the front of the stationary fence portion 38 (see FIGS. 4 and 5) to properly position the same horizontally when the fence assemblies 18 are mounted to the side portions 34.

As previously mentioned, the downwardly inclined surface 76 is provided so that it need not be machined to a high tolerance because it is essentially out of contact when the fence assemblies 18 are installed. However, the narrow horizontal surface 74 is relatively small in area and can be easily machined to accurately position the stationary fence portion and enable convenient insertion of the bolt 64 in the aperture 72.

While the preferred embodiment has a narrow horizontal locating surface 74, it should be understood that other embodiments may not have such a horizontal surface and in fact may have a space or a gap between the bottom of the stationary fence portion and adjacent surface such as the surface 74 and that the vertical positioning of the stationary fence would be determined by the placement of the apertures and use of the bolts to bring the front face 52 of the stationary fence portion 38 into contact with the vertical fence locating surface 70 which is machined to a close tolerance. Also, while the bolts 64 are shown to have an internal hexagonal configuration, other configurations may be employed, such as an external hex head or other configuration. It should also be understood that regular washers 80, as shown in FIG. 3 may be used.

Figure 7:
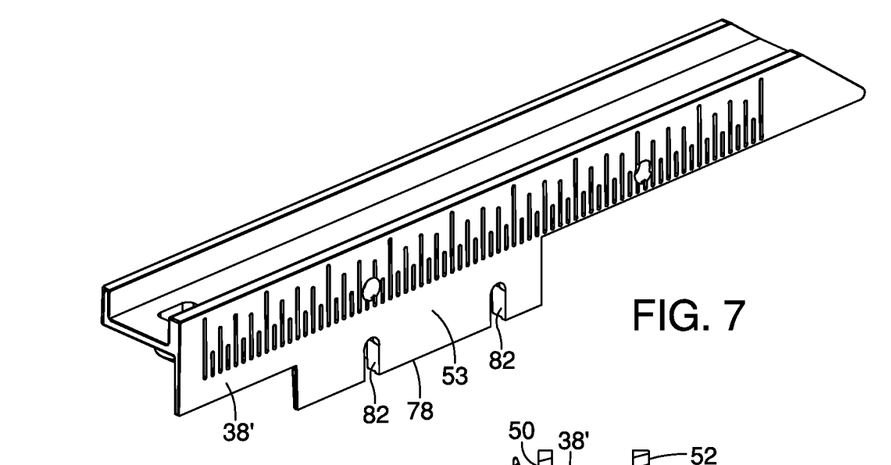
FIG. 7 is a rear perspective of an alternative embodiment of a portion of a fence assembly shown in FIG. 5.
Figure 8:
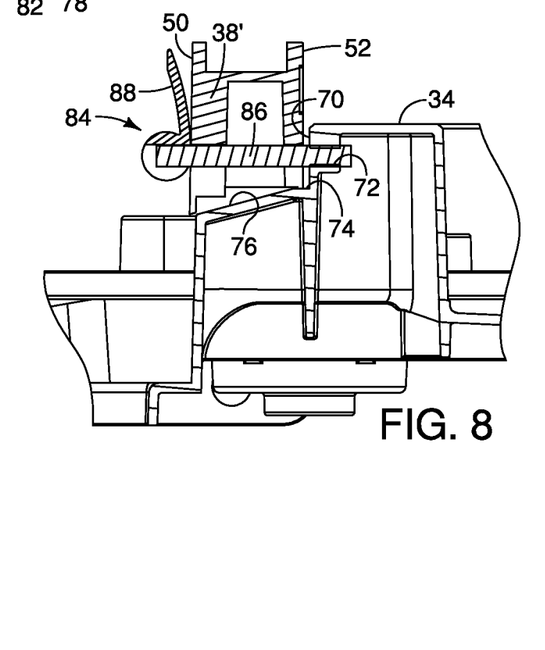
FIG. 8 is a right plan view, partially in section, of the base and the alternative fence assembly shown in FIG. 7, shown with the fence in an unlocked position.
Figure 9:
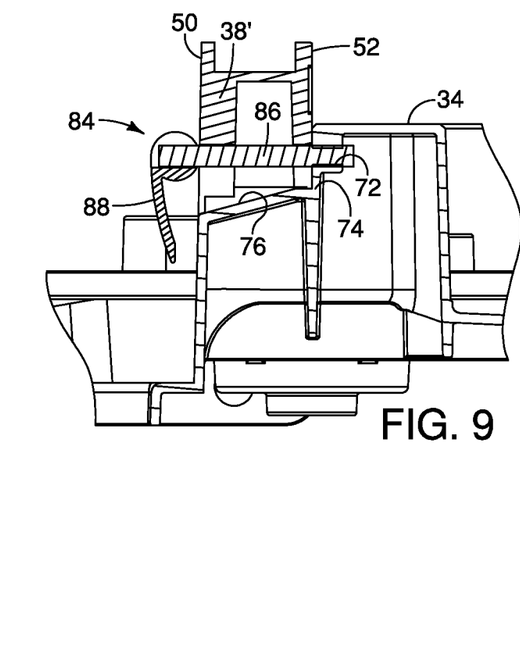
FIG. 9 is a right plan view, partially in section, of the base and the alternative fence assembly shown in FIG. 7, shown with the fence in a locked position.

While the embodiments shown in FIGS. 1-5 have apertures 56 and 58 for receiving bolts 64, an alternative embodiment may be used and is shown in FIGS. 7, 8 and 9 wherein the stationary fence portion 38' has a pair of slots 82 that extend from the location of an aperture 56 downwardly to the bottom surface 78 of the front of the stationary fence portion 38'. This configuration may utilize a cam lock bolt, indicated generally at 84, to hold the stationary fence portion to the side portions 34. The cam lock bolt 84 has a threaded shank 86 that engages the threaded openings 72 in the vertical fence locating surface 70 and has a cam lever 88 that can bear against the rear surface 50 to tighten the stationary fence to the side portions 34. In this regard, the cam lever 88 is shown in its untightened position in FIG. 8 where the front face 52 of the stationary fence portion 38' is out of contact with the vertical fence locating surface 70. FIG. 9 shows the lever 88 in its locked position.

Figure 10:
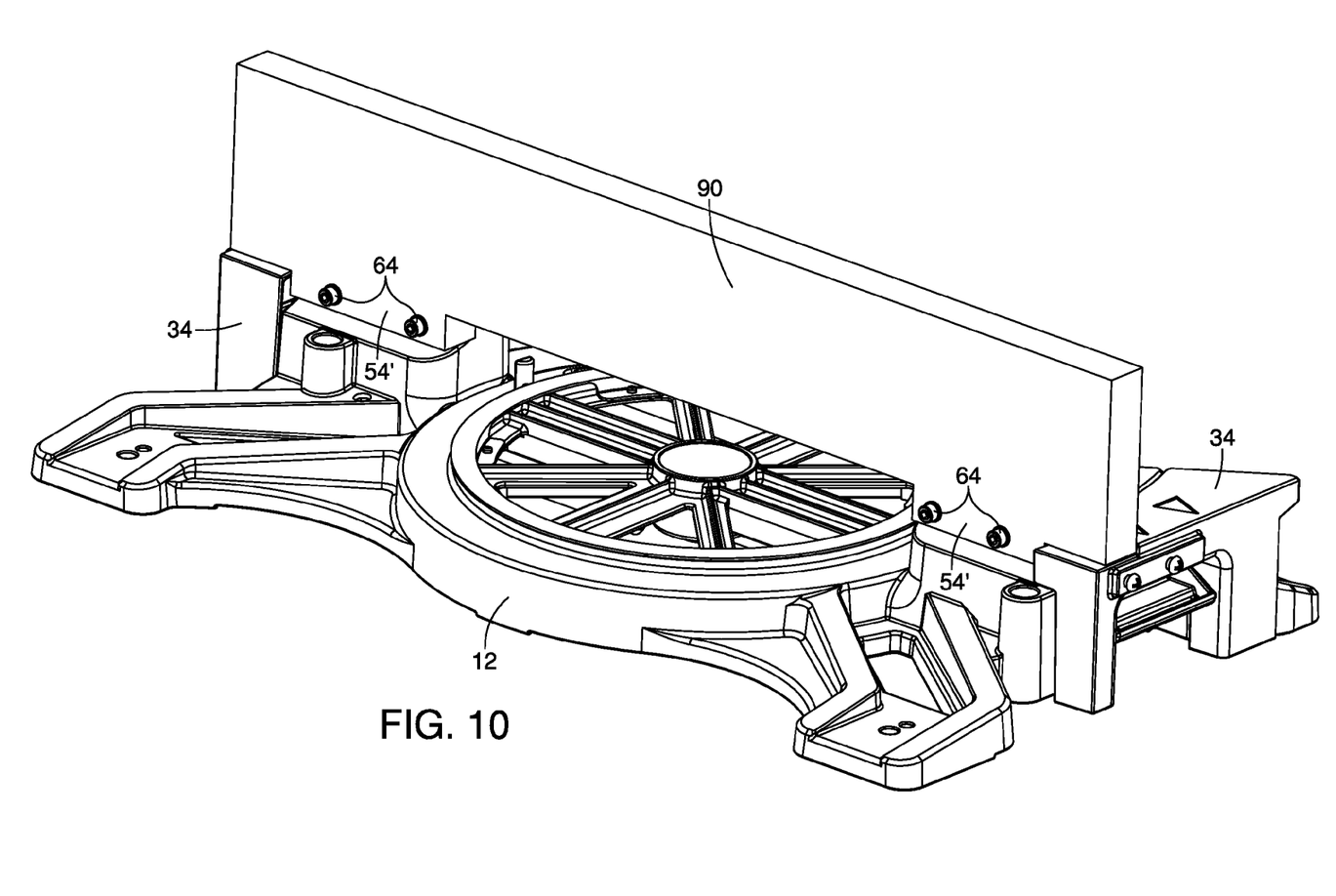
FIG. 10 is left rear perspective of the base of the power miter saw similar to FIG. 2, illustrating a sacrificial fence attached to the base rather than a supplied fence.

The sacrificial fence 90 is shown in FIG. 10 and is preferably made of wood, plywood or the like and is cut to have a lower rectangular extension 54' that is similar to the shape of the stationary fence portions 38 and is provided with apertures so that bolt 64 can secure the fence 90 to the side portions 34.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power miter saw comprising:
   a base having a center portion configured to support a rotatable table and side portions on opposite sides of said center portion, said side portions having a flat working surface for supporting a work piece;
   a rotatable table operatively connected to said base and rotatable relative to said base about a vertical pivot in either rotatable direction relative to a zero position and having a top surface for supporting a work piece;
   a pivotable arm operatively connected to said table and having a blade and motor assembly secured thereto that is configured to be lowered toward said table to engage a work piece positioned thereon;
   said flat working surface of said side portions being coplanar with said top surface of said table;
   a fence assembly extending between said base side portions and including an elongated stationary fence portion having a front vertical contacting surface and an opposite rear surface and a removable fence portion configured to be slidably attached to said stationary fence portion;
   each of said base side portions having a generally vertical fence positioning surface extending downwardly substantially perpendicularly from said flat working surfaces and being coplanar with one another and perpendicular to the plane of the blade when the table is in said zero miter position; and
   at least one attachment device for applying a horizontal force to said stationary fence portion for holding said front vertical contacting surface against each of said vertical fence positioning surfaces independently of said removable fence portion; and
   each of said vertical fence positioning surfaces having at least one aperture therein for receiving one of said attachment devices and said stationary fence portion having at least one aperture aligned with said aperture in said vertical fence positioning surface;
   wherein said at least one aperture of said vertical fence positioning surface is a horizontally oriented threaded aperture, and said attachment device is a threaded member configured to extend through said aperture in said stationary fence portion and be screwed into said horizontally oriented threaded aperture in said vertical fence positioning surfaces.

2. A power miter saw as defined in claim 1 wherein said aperture in said stationary fence portion is round and said threaded member is a bolt with a head having a hexagonal configuration.

3. A power miter saw as defined in claim 2 wherein said aperture in said stationary fence portion has a through hole sized to accept said bolt and a cylindrical recess having a flat annular bottom surface sized to retain a spherical washer set, said bolt head being configured to contact said spherical washer set and hold said stationary fence portion against said vertical fence positioning surface when said bolt is tightened.

4. A power miter saw as defined in claim 3 wherein said spherical washer set comprises two washers with central openings and outer flat surfaces that fit together with contacting surfaces that are spherically configured.

5. A power miter saw as defined in claim 1 wherein said aperture in said stationary fence portion is an open slot having a width sized to receive said threaded member and said threaded member is a threaded cam lock bolt having a lever portion configured to rotate a cam surface into and out of locking relation with said fence assembly.

6. A power miter saw as defined in claim 1 wherein each of said side portions of said base further comprise a narrow flat portion generally parallel to said flat working surface intersecting the bottom of said vertical fence positioning surface, said narrow flat portion merging with a downwardly inclined surface that extends at least to a position that is coextensive with said opposite rear surface of said stationary fence portion.

7. A power miter saw as defined in claim 1 wherein said fence assembly comprises a sacrificial fence made from disposable material.

8. A power miter saw as defined in claim 7 wherein said disposable material is plywood.

9. A power miter saw as defined in claim 1 wherein said pivotable arm and blade and motor assembly are rotatable about a stationary horizontal pivot to enable said blade to make bevel cuts in a work piece.

10. A power miter saw comprising:
    a base having a center portion configured to support a rotatable table and side portions on opposite sides of said center portion, said side portions having a flat working surface for supporting a work piece;
    a table rotatably connected to said saw base and having a zero miter angle position;
    a saw blade and motor assembly operatively connected to said table;
    a fence assembly extending between said base side portions and including an elongated stationary fence portion having a front vertical contacting surface and an opposite rear surface and a removable fence portion configured to be slidably attached to said stationary fence portion;
    each of said base side portions having a generally vertical fence positioning surface extending downwardly substantially perpendicularly from said flat working surfaces and being coplanar with one another and perpendicular to the plane of the blade when the table is in said zero miter position, said fence positioning surfaces being configured to accurately position a fence assembly relative to said table; and
    a securing mechanism for applying a substantially horizontal holding force for holding said stationary fence portion securely to said vertical fence positioning surfaces independently of said removable fence portion;
    wherein said securing mechanism comprises horizontally oriented threaded elongated members which extend through apertures in said fence assembly and screw into aligned apertures of said side portions.

11. A power miter saw as defined in claim 10 wherein said table has a flat top surface and said flat working surface of said side portions is generally coplanar with said top surface of said table.

12. A power miter saw as defined in claim 10 wherein each of said side portions have two elongated members securing said fence assembly thereto.

* * * * *